INVENTORS
RICHARD W. HOUSER
DAVID F. WOODLOCK
BY
*Theron H. Nichols*
AGENT

United States Patent Office 3,516,625
Patented June 23, 1970

3,516,625
AIRCRAFT STEERABLE MAIN LANDING GEAR
Richard W. Houser, Seattle, and David F. Woodlock, Mercer Island, Wash., assignors to The Boeing Company, Seattle, Wash., a corporation of Delaware
Filed Apr. 25, 1968, Ser. No. 724,159
Int. Cl. B64c 25/50
U.S. Cl. 244—50                                      32 Claims

ABSTRACT OF THE DISCLOSURE

An aircraft landing gear having a steering system for programming steerable main wheels to a steerable nose wheel for steering large aircraft weighing over 500,000 pounds while taxiing.

The disclosed steering system is combined with various alternative main landing gears, as set forth in paragraphs 1 to 3 below, all having a steerable nose wheel and all having at least one main landing gear steerable wheel or wheel truck:

(1) Two tandem, fore and aft transverse rows of wheels, the aft row comprising one or more steerable wheels and the fore row comprising one or more fixed wheels, (2) Two fore and aft rows of wheels, the aft row comprising a fixed wheel or wheels and the fore row comprising one or more steerable wheels, and (3) One row of coaxial, steerable wheels.

In all of the above landing gears, each of the steerable main wheels is programmed to the steerable nose wheel to turn until the transverse axis of each steerable main wheel intersects that of the fixed wheels, if any, which point of intersection is common with the intersection of the nose wheel transverse axis, whereby all landing gear wheels have a common center of turning radius to alleviate tire scrubbing and excessive tire wear while taxiing and to reduce engine thrust required because of reduced turning moment required. Also, the new programming system causes the individually turning circles of all wheels to be concentric with each other.

A delay pick-off is provided further for delaying all turning signals to the main wheels until the nose wheel has turned through 20°, for example, or angles greater than required during takeoff and landing.

BACKGROUND OF THE INVENTION

Field of the invention

This invention appears to be classified in Class 244, Subclass 50, "Special Devices Not Ordinarily Used in Steering or Propelling in Flight, Incorporated With Aircraft Structure and Particularly Adapted to Provide for Steering and/or Propelling the Aircraft on Land or Water or Both."

SUMMARY OF THE INVENTION

The disclosed invention pertain to a multiple wheeled landing gear and a ground steering system therefor for large aircraft, i.e. over 500,000 pounds, having an auxiliary steerable nose wheel landing gear and a main landing gear comprising a plurality of transverse wheels and particularly fore and aft wheels, such as but not limited to a landing gear as disclosed in assignee's patent application identified above.

The illustrated aircraft landing gear steering system comprises a programming system combined with a steerable landing gear including a steerable nose wheel and fore and aft groups of main landing gear wheels or trucks of wheels, one of the groups of wheels being steerable so that the steerable group of main wheels or wheel trucks are turned in a direction opposite to turning of the nose wheel and in an amount proportional to the nose wheel turning whereby the turning radii of all wheels have a common center, i.e., the transverse axis of each of the steerable trucks intersects the transverse axis of the fixed trucks at the same point of intersection as that of the nose wheel transverse axis with the fixed trucks' transverse axis for alleviation of tire scrubbing and excessive tire wear and for reduced engine thrust because of reduced turning moment required while taxiing. Stating it in another manner, in making a turn as the nose wheel rolls on its turning circle, the new programming system causes the steerable main wheels and the fixed main wheels, if any, all to roll on their respective turning circles, the feature being that all turning circles are concentric.

This invention is particularly useful on large heavy aircraft which require high thrust forces or turning moment when using brakes on one side to turn the aircraft while taxiing, and/or when all turning forces and inertia of the whole aircraft are borne by the steerable nose wheel when turning on the ground. This turning moment is significant in aircraft the size of the Boeing 747 and Boeing 2707, SST (Supersonic transport), and more particularly on the SST where the engines are close coupled to the fuselage with a correspondingly short lever arm requiring close to maximum thrust for sharp turns. Accordingly, because the disclosed steerable main wheels provide a shorter turning radius for the same degree of nose wheel turning, or for the same turning radius, less nose wheel turning is required with the disclosed steerable main wheels than without the steerable main wheels, the engine thrust may be reduced resulting in a reduction in fuel consumption while taxiing on the ground and providing greater flight range capability.

Also, reduced thrust required on the ground means reduced noise, a problem in this time when so many people live so close to so many airports.

The programmer comprises a pair of primary quadrants for receiving turning signals from the nose wheel steering system and transmitting them back to a pair of secondary quadrants which transmit differential signals to the main wheel metering valve and followup mechanisms for the main landing gear steerable trucks for causing each to turn about the same center of turning radius as the rest of the landing gear wheel trucks. If desired, the primary quadrants also have the feature of inserting a delay in the signal pick up to the secondary quadrants for causing turning of the main wheels only in sharp turns, as only after the nose wheel has turned through 20°, for example.

While the Boeing 747 type of aircraft may delay turning of the main wheels until the nose wheel has turned 20°, the Boeing 2707, SST type of aircraft main landing gear may steer for all angles of nose wheel turning above 10°, if any angle at all.

In the fore and aft steerable main landing gears utilized with the disclosed programmer, while either one of the transverse rows of wheels or trucks may be steerable and the other row fixed about their vertical axes, the preferred landing gear has the fore row of wheels or trucks fixed and the aft row steerable so that each of the wheel trucks of the aft row is programmed to turn until its transverse axis intersects the intersection of the nose wheel axis and fore row transverse axis for alleviation of tire scrubbing and excessive tire wear and high engine thrust during taxiing turns.

Likewise this programmer may be utilized in steerable landing gears having only one or more steerable main landing gear wheels or wheel trucks wherein each main wheel or truck is turned in the opposite direction to the nose wheel and about the same center of turning radius as the nose wheel.

Two different metering valve and followup mechanisms are disclosed for use in the steering system of the disclosed main landing gear wheels.

A problem in the design of large, heavy aircraft, such as those weighing over 500,000 pounds is the provision for a steering system for the large landing gear to insure the alleviation of tire scrubbing and excessive tire wear and a minimum turning moment.

Accordingly, a primary object of this invention is to provide landing gears for aircraft weighing over 500,000 pounds having a steering system that will alleviate scrubbing of tires and excessive tire wear and require reduced engine thrust while taxiing.

Another object of this invention is to provide a steering system for a multiple truck main landing gear for heavy aircraft in two tandem or fore and aft rows with all trucks and nose landing gear turning above the same center of turning radius while preventing scrubbing of the tires and excessive tire wear and require reduced engine thrust during taxiing turns.

A further object of this invention is to provide a steering system for multiple truck, tandem row landing gear having at least two coaxial and pivotal trucks in one of the rows for turning all of the pivotal trucks in an opposite direction to the steerable nose wheel until all trucks and nose wheel are turning about the same center of turning radii.

A still further object of this invention is to provide a steering system for a multiple truck tandem landing gear having at least one steerable aft truck for turning the aft truck oppositely to the nose wheel for alleviation of tire scrubbing and excessive wear of tires and high engine thrust during taxiing turns.

A still further object of this invention is to provide a steering system for a multiple truck tandem main landing gear having at least two coaxial, steerable trucks in the fore row for turning the fore row trucks in the same direction as the nose wheel for alleviation of tire scrubbing and excessive tire wear and high engine thrust while taxiing.

Another object of this invention is to provide a steering system for a multiple truck, coaxial main landing gear for making all main landing gear trucks turn to a direction opposite to the nose wheel and for making all trucks and nose wheel turn about the same center of turning radii for preventing excessive tire wear and tire scrubbing during turns while taxiing, and for reducing the aircraft turning radius for the same degree of nose wheel turning.

BRIEF DESCRIPTION OF DRAWINGS

The drawings diagrammatically illustrate by way of example, not by way of limitation, two forms of the invention wherein like reference numerals designate corresponding parts in the several views in which.

DESCRIPTION OF THE PREFERRED EMBODIMENTS

The invention, the scope of which being defined in the appended claims, is not limited in its application to the details of construction and arrangement of parts shown and described, since the invention is capable of other embodiments and or being practiced or carried out in various other ways. Also it is to be understood that the phraseology or terminology employed herein is for the purpose of description and not of limitation.

STEERABLE AFT MAIN WHEELS EMBODIMENT

Figure 1:
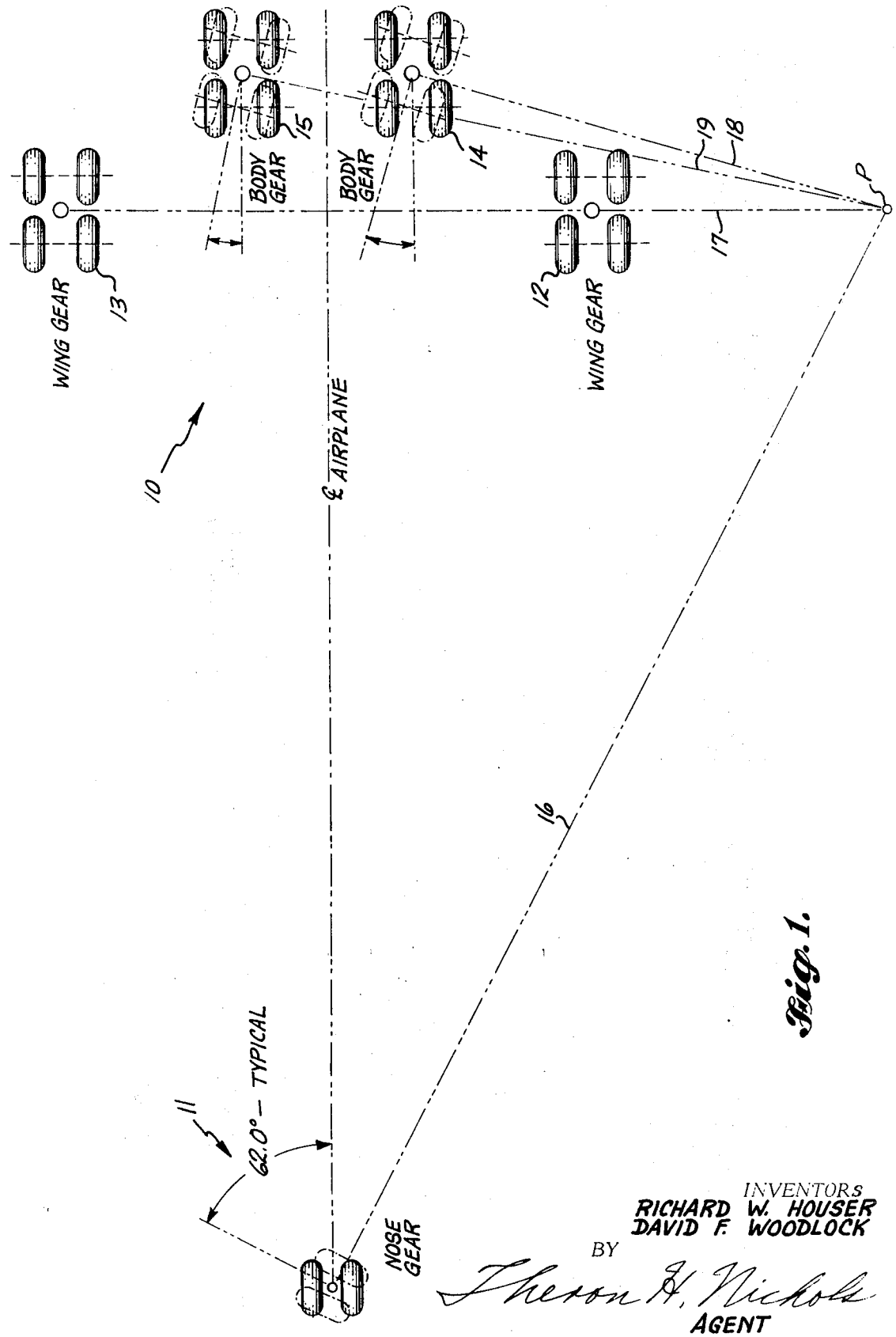
FIG. 1 is a schematic plan view of the preferred embodiment of a multiple truck aircraft landing gear in which the aft main wheels are steerable, illustrating how all wheels turn about the same center of turning radius.

FIG. 1 discloses a multiple truck, steerable, main landing gear 10 and an auxiliary, steerable, nose wheel landing gear 11, all illustrated in plan form with the steering system deleted for clarity of disclosure. Here the main landing gear wheel trucks are shown in two tandem, transverse rows, each of the fore row of trucks, 12 and 13, being coaxial and fixed about its vertical axis and each of the aft row trucks 14, and 15, being coaxial and pivotable about its vertical axis. While each fore and aft row of main landing gear trucks is illustrated as comprising a pair of trucks, if so required by the aircraft design, more or less trucks may be utilized in each row, it being necessary that all trucks of the fixed row be coaxial and all trucks of the other row be pivotable and steerable in both directions, so that with turning of the nose wheel to the left, for example, its transverse axis 16 is caused to intersect the transverse axis 17 of the fixed trucks 12 and 13 at a point P and the new steering system disclosed in FIGS. 4–8 causes each of the main wheel steerable trucks, 14 and 15, FIG. 1, to turn proportionately to the nose wheel until their transverse axes 18 and 19, respectively also intersect point P, the common center for the turning radii of all trucks.

If the aircraft is so designed, a large wheel or pair of coaxial wheels may be substituted for each truck of wheels.

STEERABLE FORE WHEELS MODIFICATION

Alternately, if the aircraft design so dictates, a quite different modification results with the fore main trucks 12 and 13 being made steerable and the aft main trucks fixed about their vertical axes whereby the point of intersection P for all wheels lies on the transverse axis of the aft main wheels. Another big difference in this modification is that the steerable main wheels are then turned in the same direction as the nose wheel and in proportion thereto to alleviate tire scrubbing and excessive wear and high engine thrust while taxiing.

ALL MAIN WHEELS STEERABLE MODIFICATION

Figure 2:
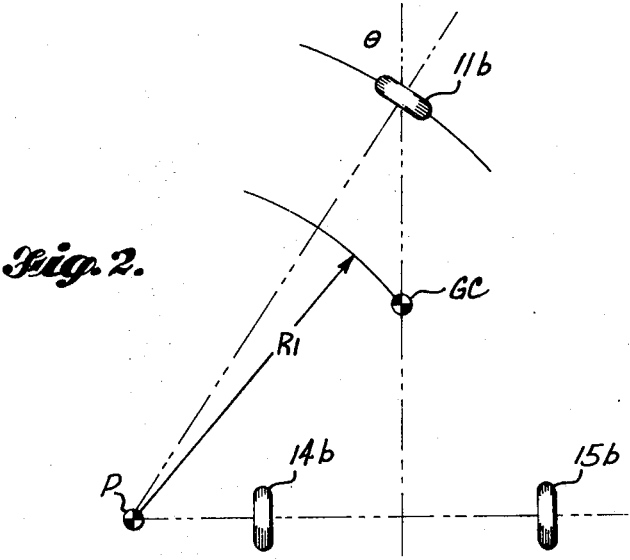
FIG. 2 is a schematic plan view of an aircraft conventional tricycle landing gear illustrating the length of the turning radius of the geometric center of the aircraft for particular nose wheel angle of turning.
Figure 9:
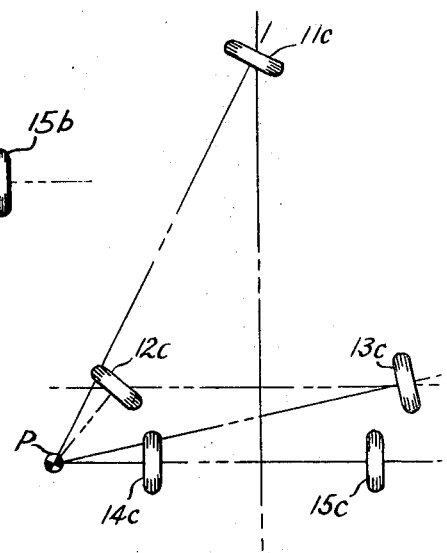
FIG. 9 is a modification of FIG. 1 wherein the fore row of main wheels is steerable.

FIG. 2 illustrates the conventional coaxial non-steerable main landing gear having main wheels 14b and 15b and nose wheel 11b, illustrating the length of the turning radius $R_1$ of the geometric center GC of the aircraft for a particular nose wheel angle $\theta$ of turning.

Figure 3:
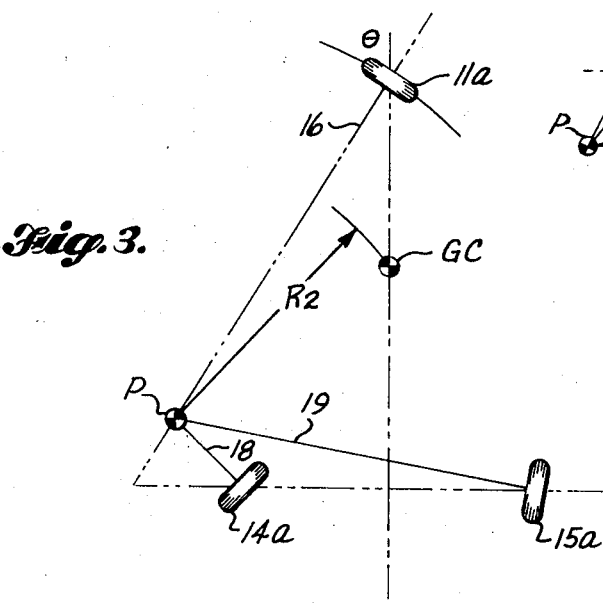
FIG. 3, similar to FIG. 2, is a schematic plan view of the new, steerable main wheel landing gear illustrating the decreased length of the turning radius to the aircraft geometric center for the same angle of nose wheel turning.

FIG. 3 illustrates the new, steerable main wheel landing gear having main wheels 14a and 15a with their transverse axes 18 and 19, respectively, intersecting the nose wheel axis 16 at P, and particularly illustrates the shorter aircraft geometric center of turning radius $R_2$ for the same nose wheel turning angle $\theta$. Also, for the same turning radius, less nose wheel turning is required with the disclosed steerable main wheels than with the conventional landing gear. Thus, less engine asymmetrical thrust is required during asymmetric braking for turning while taxiing due to the reduced turning moment required resulting in reduced fuel consumption and less noise.

Figure 5:
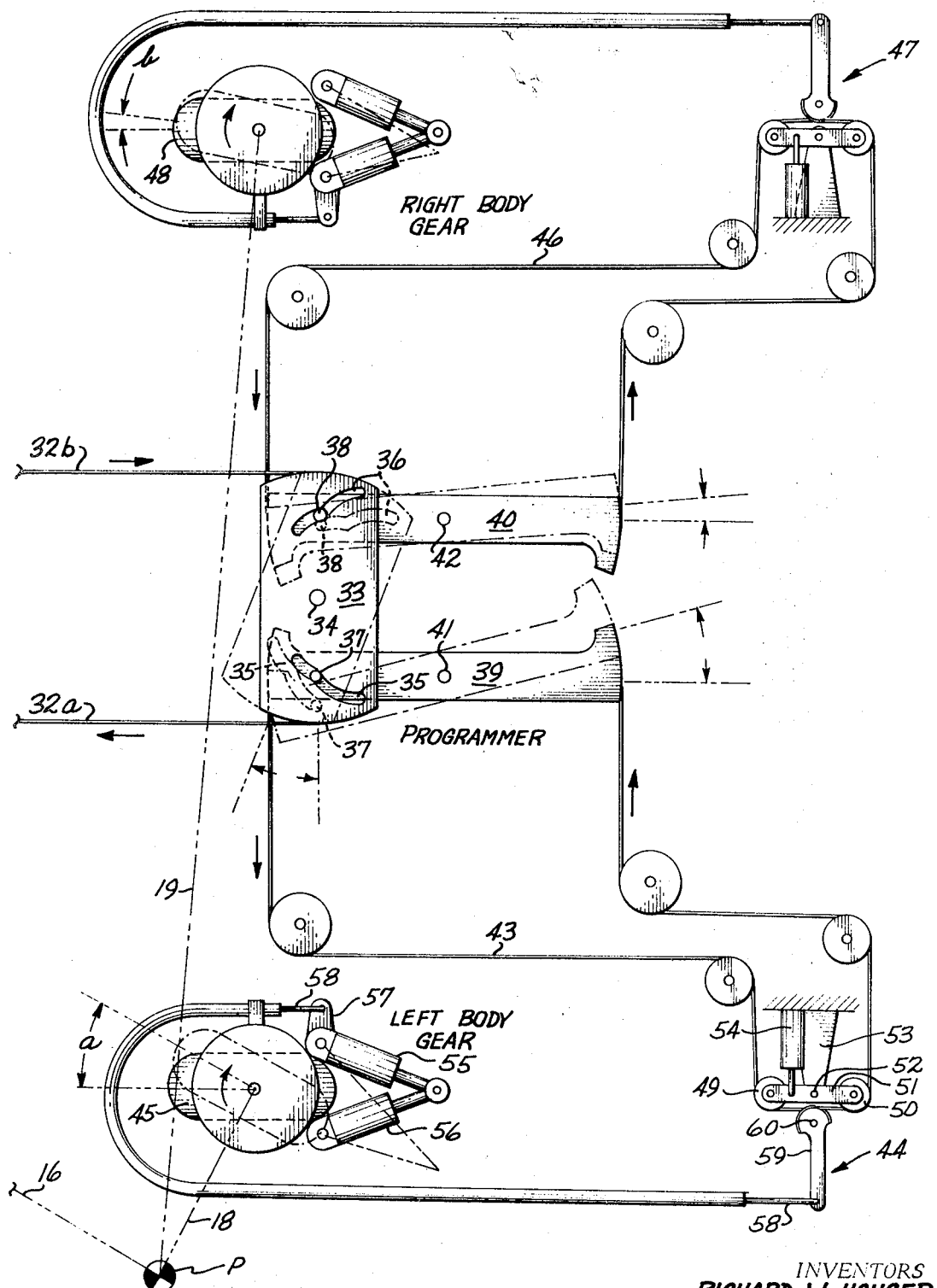
FIG. 5 is a schematic plan view of the rearward portion of the landing gear steering system showing secondary programming quadrants connected to the main landing gear.

FIG. 5 discloses more details of the FIG. 3 landing gear as one modification of the basic invention for certain aircraft designs utilizing only one row of a pair or more of steerable main trucks or wheels 14a, 15a as the sole main landing gear, whereby each wheel or truck is turned in response to and proportionately to the nose wheel 11a and in an opposite direction to the nose wheel turning until the transverse axes 16, 18, and 19 of each intersects at a common point P in front of the main wheels.

Figure 4:
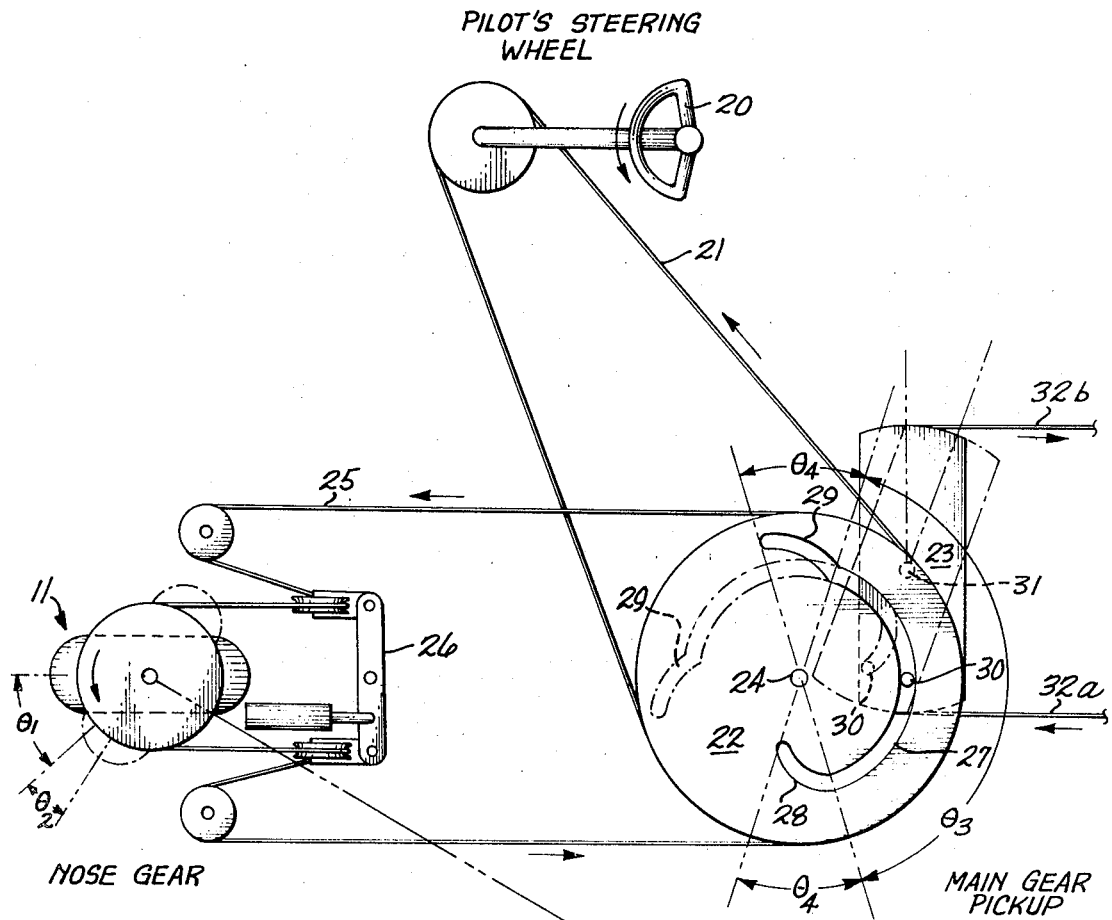
FIG. 4 is a schematic plan view of the forward portion of an aircraft landing gear steering system showing primary programming quadrants connected in the pilot's nose wheel steering system.

FIG. 4 discloses primary quadrants of the steering system connected to the pilot's nose wheel steering system. In this regard, the pilot's control wheel 20 having a drum is connected with cable 21 to the first of two primary quadrants, 22 and 23. First primary quadrant 22 is pivotable about its pivot pin 24 to a conventional nose gear metering valve and followup mechanism 26 for operating nose gear steering actuators for the nose wheel landing gear 11.

First primary quadrant 22, FIG. 4 has cam track portions 27, 28, and 29 for controlling cam roller 30 on the second primary quadrant 23 which is pivotable about its pivot pin 31 secured to aircraft structure.

Cam cylindrical portion 27, FIG. 4 is substantially concentric with quadrant pivot 24 to provide a delay in turning signals to the main steering landing gear, the turning angle $\theta_1$ of the nose wheel being proportional to and corresponding to $\frac{1}{2}$ of angle $\theta_3$ wherein in such a small angle of turning on the ground, for example, turning of the main wheels may not be necessary and no steering signal is transmitted aft. Angles $\theta_1$ and $\theta_3$ are exaggerated for simplicity of disclosure. Then for any sharp turn as that beyond $\theta_1$, as the additional angle $\theta_2$, the cam roller now rides in the arcuate portions 28 or 29 through angle $\theta_4$ corresponding to angle $\theta_2$ and rotates the second primary quadrant 23 about its pivot 31 to transmit steering signals aft via cables 32a, 32b, for turning the main steerable wheels in the sharp turns during taxiing. Thus the primary quadrants 22 and 23 are responsive to the steerable nose wheel input signals from cable 21.

SECONDARY QUADRANTS OF FIG. 5

FIG. 5 discloses the aft portion of the steering system or secondary quadrants for steering the main landing gear. The first secondary quadrant 33 is rotatable by cables 32a, 32b, about its pivot pin 34 fixed to aircraft structure and carries two enantiomorphic cam tracks 35 and 36.

In cam tracks 35 and 36, FIG. 5 are cam rollers 37 and 38, respectively, mounted on and supported by the respective second left and right secondary quadrants 39 and 40, the latter quadrants being the enantiomorphic analogue of each other. Left secondary quadrant 39 is pivotal about its pivot pin 41 on suitable aircraft structure and the right secondary quadrant 40 is pivotal about its pivot pin 42 on suitable aircraft structure.

Further, as shown in FIG. 5, a cable 43 connects the left secondary quadrant 39 with the metering valve and followup mechanism 44 of the left steerable main wheel 45, and cable 46 connects the right secondary quadrant 40 with the metering valve and followup mechanism 47 of the right steerable main wheel 48.

Figure 6:
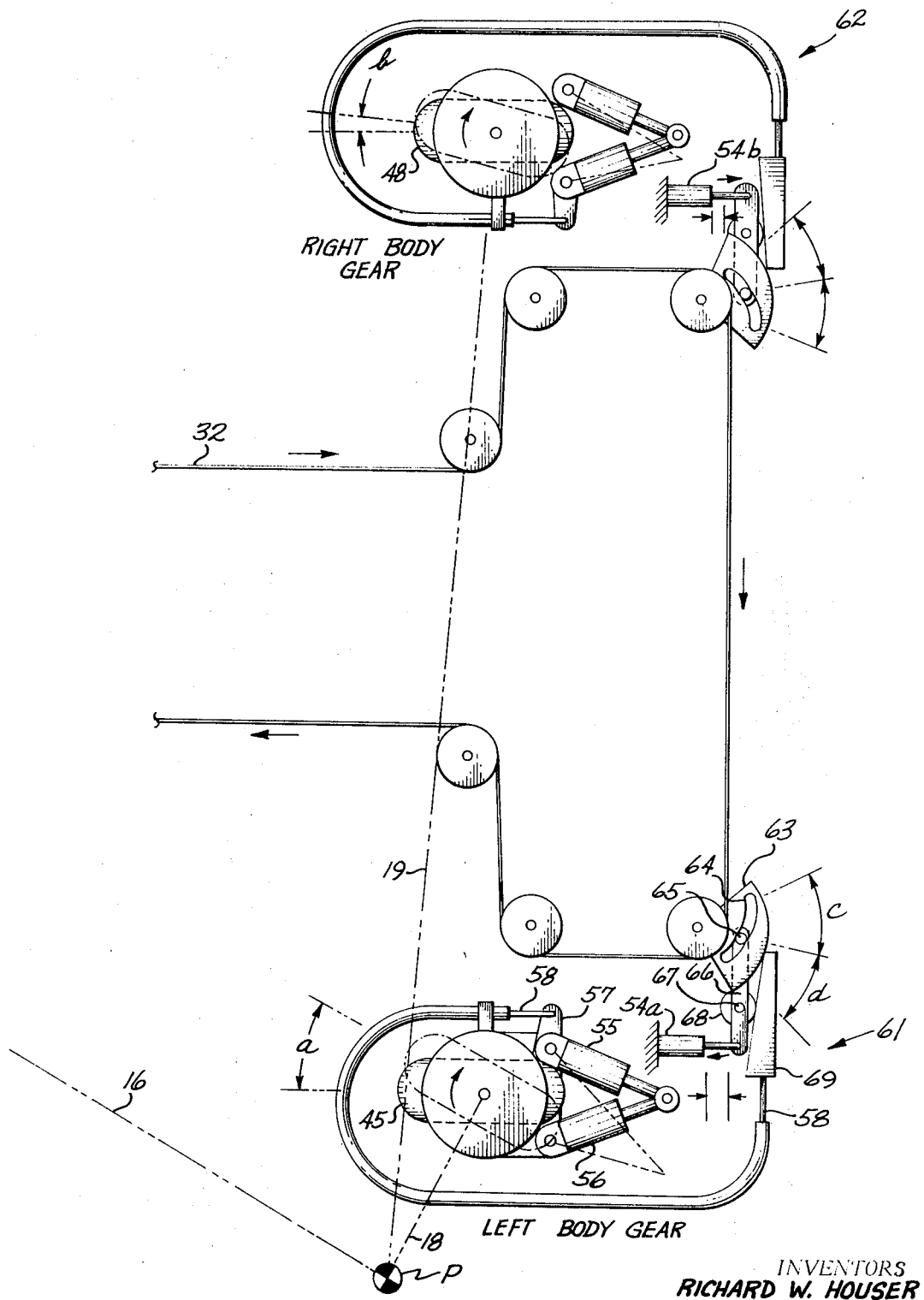
FIG. 6 discloses a modification of the steering system of FIG. 5.

Instead of the main landing gear steerable trucks 14 and 15 being illustrated in FIGS. 5 and 6, steerable wheels 45 and 48 are utilized for simplicity of design and disclosure.

POINT P FOR THE VARIOUS MODIFICATIONS

Point P, FIGS. 1, 3, 5, and 6 is the point of intersection of the turning radii of all landing gear wheels simultaneously as controlled by the primary and secondary quadrants having their respective cam tracks.

In the modification of FIG. 1 wherein the aft main wheels are steerable and turn in proportion to turning of the nose wheel and the fore main wheels are fixed, point P is the intersection of the nose wheel transverse axis with the transverse axis of the fixed wheels or wheel trucks and also the intersection of the transverse axis of each of the main landing gear steerable wheels or wheel trucks.

In one modification wherein the fore main wheels are steerable and the aft main wheels are fixed, the steerable fore wheels are programmed to the steerable nose wheel for turning the steerable fore wheels until the transverse axis of each intersects the point P where the nose wheel axis intersects the aft fixed main wheels' axis.

In another modification wherein all main wheels or trucks are steerable, point P is the common point of intersection of the transverse axis of each wheel or truck with the nose wheel axis.

In another modification, only one row of steerable main wheels or trucks may be utilized wherein point P is the intersection of each wheel or truck with the nose wheel axis.

MAIN WHEEL METERING VALVE AND FOLLOW-UP MECHANISM OF FIG. 5

FIG. 5 illustrates the left steerable main wheel metering valve and followup mechanism 44 comprising cable 43 rolling over pulley wheels 49 and 50 on the ends of a rocking lever 51 pivoted on pin 52 on lug 53. Metering valve 54 is operably connected (not shown) to the interconnected wheel hydraulic actuators 55 and 56 forming the upper scissors link for turning the left steerable wheel 45, such as but not limited to an actuator steering system as disclosed in assignee's copending patent application, Ser. No. 655,819, filed July 25, 1967, by F. W. Scherer. Followup motion is provided from the wheel actuators 55, 56, the former having a lug 57, by a followup cable 58 extending from the lug to one end of a lever 59 pivotal about pin 60, the other end of the lever being connected to the cable 43.

In operation of the FIG. 5 main wheel metering valve and followup mechanism 44, a left turning motion of cable 43 (in the direction of the arrows for example) pulls roller 50 inwardly, turning lever 51 counter-clockwise, extending and opening valve 54 against a centering spring (not shown) and metering hydraulic fluid to actuator 55 for turning the left main wheel 45 to the right for turning the aircraft to the left. As actuator 55 moves to its programmed position, cable 58 pulls lever 59 which in turn permits lever 51 and valve 54 to return to their original positions by action of metering valve 54 centering spring (not shown). Similarly, the right main wheel 48 is turned to the right by the right main wheel metering valve and followup mechanism 47, the amount of turning of the right wheel not being as great as programmed by the secondary quadrants 33, 39, and 40 for maintaining the radii of all wheels intersecting at common point P.

Likewise, for a turn to the right, movement opposite to that described above result as controlled by the quadrants, the main wheel metering valve and followup mechanism 44 and 47 being the allochiral analogue of each other. In a right turn, for example, the left followup mechanism lever 51 rotates clockwise to contract and open metering valve 54 for metering fluid to actuator 56 instead, for turning left main wheel 45 to the left for turning the aircraft to the right. Likewise, as actuator 56 reaches its programmed position, cable 58 pushes lever 59 which in turn permits lever 51 and valve 54 to return to their original positions by action of metering valve 54 centering spring (not shown).

SECONDARY QUADRANT OF FIG. 6

FIG. 6 discloses a modification of the secondary quadrants and aft portion of the steering system.

Cable 32, FIG. 6, from the forward primary quadrants extends continuously over suitable pulleys through both left and right hand modified main wheel metering valve and followup mechanisms 61 and 62, respectively, for steering the main wheels 45 and 48 differentially like the embodiment of FIG. 5, the inside wheels in a turn being turned a greater angle than the outside wheels for insuring that all main wheels as well as the nose wheel remain tangent to their individual turning circles centered at point P, angle $a$ being greater than angle $b$ in a left turn, for example.

More particularly, cable 32, FIG. 6 turns the first secondary quadrant 63 having cam track 64 therein. A cam roller 65, operable in the cam track 64, is mounted on an inner end of the second secondary quadrant or summing lever 66 pivotable about pin 67 in roller 68.

MAIN WHEEL METERING VALVE AND FOLLOWUP MECHANISM OF FIG. 6

Pivotally mounted on the outer end of the second secondary quadrant or summing lever 66 is a metering valve 54$a$, spring urged to the center position shown in FIG. 6. The metering valve 54$a$, hydraulic actuators 55 and 56, lug 57, and cable 58 are similar in construction and operation to those disclosed in FIG. 5. Push-pull cable 58 actuates linear cam 69 to close metering valve 54$a$ after the wheel has turned to the programmed angle. The right main wheel metering valve and followup mechanism 62 is similar to that above, as 62 is the enantiomorphic analogue of 61.

In operation of the FIG. 6 embodiment, movement of cable 32 in a clockwise direction through the secondary quadrants signaling a left hand turn, for example, rotates quadrant 63 and its cam track 64 clockwise through an angle within the range of angle $c$ (through range of angle $d$ in right turns) rotating summing lever 66 clockwise to actuate the metering valve 54 to the left of the illustrated neutral position. Actuator 55 extends until wheel 45 has turned through its programmed angle $a$ in response to the contracting metering valve signal, thereby pulling cable 58, lowering linear cam 69, and allowing the metering valve 54 to return to the neutral position. The right main wheel metering valve and followup mechanism 62 is operated similarly for turning main wheel 48 through the lesser angle $b$ during a left turn, for example.

Also, as is seen on FIG. 6, the amount of expanding movement of metering valve 54$b$, for example, for turning the outside wheel is programmed to be less than the amount of contraction of metering valve 54$a$ for turning the inside wheel in programming all wheels to turning about the same point P. The same is true when turning to the right.

While only the single wheels 45 and 48, are illustrated in FIG. 6 as being controlled by the new steering system, obviously dual wheels, wheel trucks, skis, or the like may be utilized and combined therewith.

Likewise, while FIG. 6 discloses two similar, allochiral main wheel metering valve and followup mechanisms, 61 and 62, for two steerable main wheels or wheel trucks, if more steerable wheels or wheel trucks are required, additional metering valve and followup mechanisms may be added, one for each, for maintaining each steerable main wheel turned until its transverse axis intersects the common point of intersection of the transverse axes of all main wheels and the steerable nose wheel.

MODIFICATION

Figure 7:
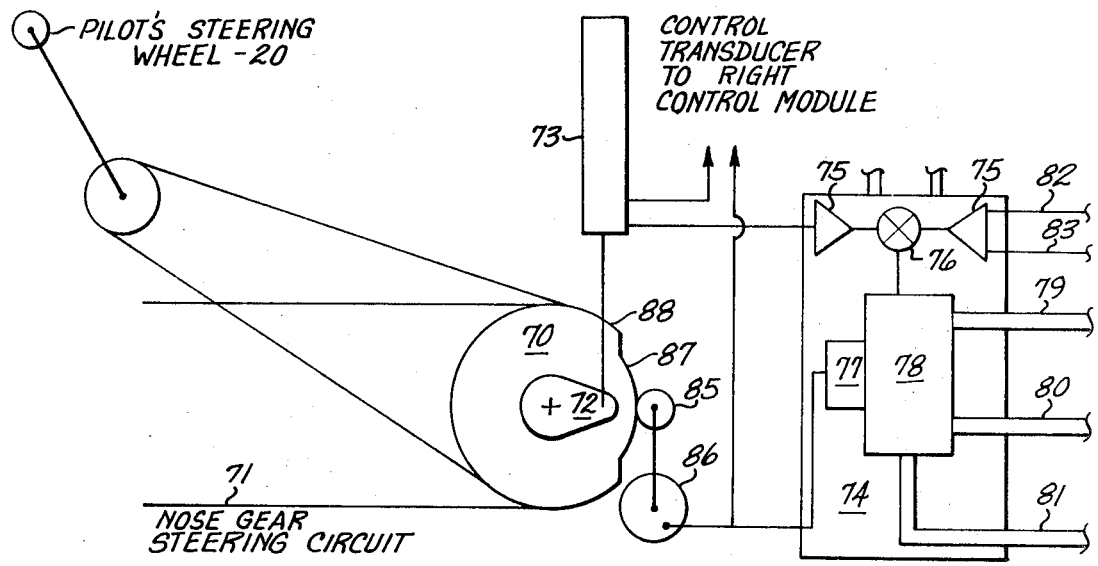
FIG. 7 is a schematic plan view of a modification and electrical analogue of the forward portion of the mechanical programming system of FIG. 4.
Figure 8:
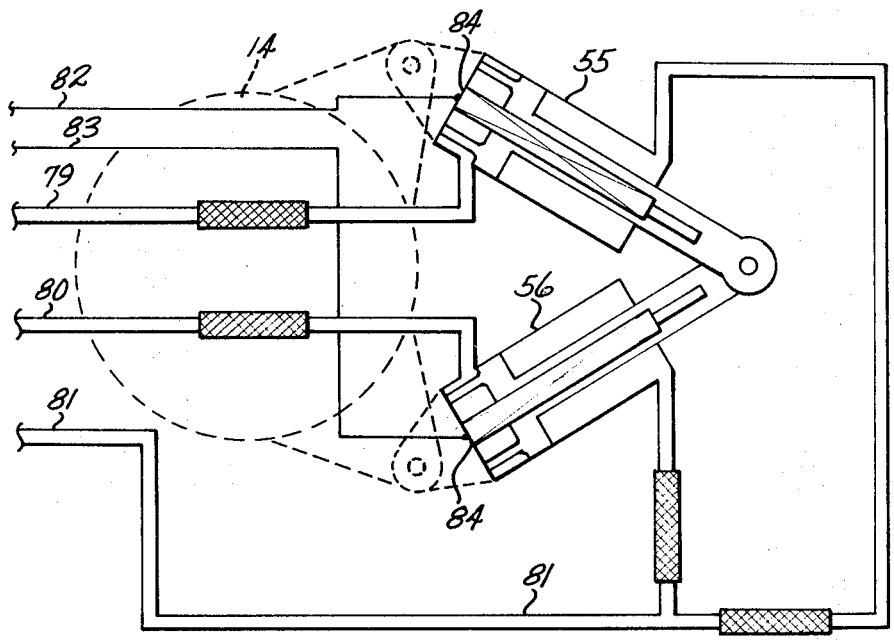
FIG. 8 is a schematic drawing of an electrical analogue of the mechanical programming system's aft portion of FIGS. 5 and 6.

FIGS. 7 and 8 disclose an electrical analogue of the mechanical programming systems disclosed above in regard to FIGS. 1 and 3–6.

FIG. 7 discloses a quadrant 70 for receiving turning signals from the pilot's steering wheel, which signals also control a nose wheel steering circuit 71. Quadrant 70 has a lever 72 fixedly connected thereto for actuating control transducer 73 for transmitting left and right landing gear electrical steering control signals proportional to the nose wheel turning as to effect a turning of the main steerable landing gear wheels in the opposite direction to the nose wheel turning, such signals being supplied to both the left electro-hydraulic control module 74 and its right enantiomorphic analogue control module (not shown), each having the required conventional amplifiers 75, summing networks 76, solenoid valve 77, transfer valves 78, for turning all steerable main wheels until their axes intersect the common point P.

In operation, for turning the left steerable wheel truck 14, FIG. 1, for example, the output of the control transducer 73, FIG. 7, to the left electro-hydraulic control module 74, after being amplified by amplifier 75, added algebraically in summing networks 76 to the amplified followup return signal from wire 82 from a conventional feedback transducer 84, FIG. 8, on actuator 55, is transmitted to transfer valve 78 for metering fluid to the proper electro-hydraulic actuator 55 or 56 through lines 79 or 80, respectively, for turning the aft wheel truck 14 in proportion to turning of the nose wheel to insure that wheel axes 16, 17, and 18 intersect at P, FIG. 1. The right enantiomorphic analogue control module (not shown) is controlled similarly by the nose wheel via the control transducer 73, FIG. 7. Thus, electrical signals are modulated through the closed loops of both the left and right control modules for turning the respective left and right steerable main wheel trucks 14 and 15, FIG. 1, until the transverse axis, 18 and 19, respectively, of each intersects the point of intersection P of the nose wheel axis 16 with the fixed main wheels' axis 17, as illustrated in FIG. 1.

The electrical quadrant 70, FIG. 7 also, when so desired, has a delay in the signal pick up so that only after cam roller 85 extending from arming switch 86 has moved from cam surface 87 to cam surface 88 are the control modules 74 activated, corresponding to turning of the nose wheel through the predetermined angle $\theta_1$, FIG. 4, as 10°, for example, if any, prior to turning of the main steerable wheels.

While only a few embodiments of the invention have been shown in the accompanying specification and drawings, it will be evident that various other modifications are possible in the arrangement and construction of the disclosed steerable main landing gear for heavy aircraft without departing from the scope of the invention, and it is accordingly desired to comprehend within the purview of this invention such modifications as may be considered to fall within the scope of the appended claims.

We claim:

1. A steerable landing gear for heavy aircraft having a steerable nose wheel having a transverse axis, and input signals to the steerable landing gear comprising,
   (a) a transverse row of coaxial, steerable, main wheels, each main wheel having a transverse axis,
   (b) programming means for said steerable main wheels,
   (c) said programming means comprises primary quadrant means and secondary quadrant means,
   (d) said primary quadrant means is responsive to said steerable landing gear input signals for transmitting steering signals to said secondary quadrant means, and
   (e) said secondary quadrant means is responsive to said steering signals for steering said main steerable wheels, for alleviation of tire scrubbing, excessive tire wear, and high engine thrust.

2. A steerable landing gear as recited in claim 1 wherein, (a) said primary quadrant means comprises a cam track controlled by said input signals and a cam follower operable in said cam track, and
(b) said secondary quadrant means is responsive to said cam follower for steering said main steerable wheels.

3. A steerable landing gear as recited in claim 2 wherein,
(a) said secondary quadrant means comprises a cam track connected to said primary quadrant cam follower, and a cam follower operable in said cam track and connected to said main wheels, and
(b) said secondary quadrant means cam follower is responsive to said primary quadrant means cam follower for steering said main steerable wheels.

4. A steerable landing gear as recited in claim 2 wherein,
(a) said primary quadrant means cam track has a predetermined delay therein corresponding to a predetermined amount of nose wheel turning, and
(b) said secondary quadrant means is responsive to said primary quadrant means for delaying the turning of said steerable main wheels until after said nose wheel has turned through said predetermined amount and then for turning said main wheels only in sharp turns during taxiing.

5. A steerable landing gear for heavy aircraft having a steerable nose wheel having a transverse axis, and input signals to the steerable landing gear comprising,
(a) a transverse row of coaxial, steerable, main wheels, each main wheel having a transverse axis,
(b) programming means for said steerable main wheels,
(c) said programming means being responsive to said steerable landing gear input signals for turning at least one of said steerable main wheels until the transverse axis of said one steerable main wheel intersects said nose wheel transverse axis for alleviation of tire scrubbing, excessive tire wear, and high engine thrust,
(d) means responsive to said steerable landing gear input signals for generating an electrical signal, and
(e) means responsive to said electrical signal for delaying the turning of said steerable main wheels until after said nose wheel has turned through a predetermined angle.

6. A steerable landing gear for heavy aircraft having a steerable nose wheel having a transverse axis and input signals to the steerable landing gear comprising,
(a) a transverse row of coaxial, steerable, main wheels, each main wheel having a transverse axis,
(b) programming means for said steerable main wheels,
(c) said programming means being responsive to said steerable landing gear input signals for turning at least one of said steerable main wheels until the transverse axis of said one steerable main wheel intersects said nose wheel transverse axis for alleviation of tire scrubbing, excessive tire wear, and high engine thrust,
(d) a second row of coaxial, fixed main wheels, each of said second row wheels having a transverse axis,
(e) said nose wheel transverse axis intersects said fixed main wheels' axis at a point when making a taxiing turn, and
(f) said programming means comprises quadrant means, said quadrant means being responsive to said steerable landing gear input signals for turning said steerable main wheels until at least one of said steerable main wheels' transverse axes intersects said point.

7. A steerable landing gear as recited in claim 6 wherein,
(a) said programming means comprises primary quadrant means and secondary quadrant means,
(b) said primary quadrant means is responsive to said steerable landing gear input signals for transmitting steering signals to said secondary quadrant means, and
(c) said secondary quadrant means is responsive to said steering signals for steering said main steerable wheels.

8. A steerable landing gear as recited in claim 7 wherein,
(a) said primary quadrant means comprises a cam track controlled by said steerable landing gear input signals and a cam follower operable in said cam track, and
(b) said secondary quadrant means is responsive to said cam follower for steering said main steerable wheels.

9. A steerable landing gear as recited in claim 8 wherein,
(a) said secondary quadrant means comprises a cam track connected to said primary quadrant cam follower, and a cam follower operable in said cam track and connected to said steerable main wheels, and
(b) said secondary quadrant means cam follower is responsive to said primary quadrant means cam follower for steering said steerable main wheels.

10. A steerable landing gear as recited in claim 8 wherein,
(a) said primary quadrant means cam track has a predetermined delay therein corresponding to a predetermined amount of nose wheel turning and
(b) said secondary quadrant means is responsive to said primary quadrant means for delaying the turning of said steerable main wheels until after said nose wheel has turned through said predetermined amount and then for turning said steerable main wheels in sharp turns during taxiing.

11. A steerable landing gear as recited in claim 6 wherein,
(a) said second row of coaxial fixed main wheels is positioned forward of said row of coaxial steerable main wheels, and
(b) said programming means comprises quadrant means, said quadrant means being responsive to said steerable landing gear input signals for turning the aft row of steerable main wheels until at least one of said steerable main wheels' transverse axis intersects said point.

12. A steerable landing gear as recited in claim 6 wherein,
(a) said second row of coaxial fixed main wheels is positioned aft of said row of coaxial, steerable, main wheels, and
(b) said programming means is responsive to said steerable landing gear input signals for turning the forward row of steerable, main wheels until at least one of said steerable, main wheels' transverse axis intersects said point.

13. In combination with a landing gear for a large aircraft including a steerable auxiliary landing gear nose wheel and a multiple wheel main landing gear in two transverse rows, fore and aft, one of said rows of main landing gear wheels being steerable in both directions, a steering system comprising,
(a) steering means for turning said nose wheel in one direction, and
(b) programming means comprises quadrant means, said quadrant means being responsive to said steering means for turning all wheels of said row of main steerable landing gear wheels for alleviation of tire scrubbing, tire wear and high engine thrust while taxiing.

14. In combination with a steerable landing gear for a large aircraft including a steerable auxiliary landing gear nose wheel and a multiple wheel main landing gear in two rows, fore and aft, the aft row of wheels being steerable in both directions, a steering system comprising,
(a) steering means for turning said nose wheel in one direction, and
(b) programming means comprising quadrant means, said quadrant means being responsive to said steering means for turning all wheels of said main landing gear aft row in the opposite direction to said nose wheel turning for alleviation of tire scrubbing, tire wear, and high engine thrust during turns while taxiing.

15. A programming means as recited in claim 14 comprising,
(a) primary quadrant means connected to said steering means and
(b) said primary quadrant means being responsive to said steering means for turning all wheels of said aft row in the opposite direction to said nose wheel.

16. A programming means as recited in claim 15 wherein,
(a) said primary quadrant means is responsive to said steering means for turning all aft row wheels in the opposite direction to said nose wheel and proportionally to said nose wheel.

17. A programming means as recited in claim 16 comprising,
(a) secondary quadrant means connected to said primary quadrant means, and
(b) said secondary quadrant means being responsive to said primary quadrant means for turning all aft row wheels in the opposite direction, and proportionally to said nose wheel.

18. A programming means as recited in claim 17 wherein,
(a) said secondary quadrant means includes cam track means and cam follower means, and
(b) said cam follower means is operable with said cam track means for turning all aft row wheels in a direction opposite and proportionally to said nose wheel.

19. A programming means as recited in claim 18 wherein,
(a) said cam follower means is responsive to said cam track means for turning all aft row wheels differentially of each other causing each of said aft row wheels to turn about a center of turning radius, all of said centers being a common point.

20. A steering system as recited in claim 14 wherein,
(a) said landing gear nose wheel has a transverse axis and each of said fore and aft main landing gear wheels has a transverse axis, said nose wheel transverse axis intersects the transverse axis of said fore row wheels at a point when making a taxiing turn in one direction, and
(b) said quadrant means is responsive to said steering means for turning all aft row wheels in an opposite direction until the transverse axis of each main landing gear wheel of said aft row substantially intersects said point.

21. A steering system as recited in claim 14 in which said nose wheel turns about a turning circle and wherein,
(a) said quadrant means is responsive to said steering means for turning all wheels of said main landing gear aft row to a position substantially tangent to turning circles concentric with said nose wheel turning circle.

22. A steering system as recited in claim 14 wherein,
(a) said quadrant means is responsive to said steering means for turning all wheels of said main landing gear aft row in the opposite direction to said nose wheel and proportionately to said nose wheel turning.

23. In combination with a steerable landing gear including a steerable auxiliary landing gear nose wheel and a multiple truck main landing gear in two rows, fore and aft, the fore row comprising at least one truck and the aft row comprising at least two steerable trucks, a steering system comprising,
(a) steering means for turning said nose wheel in one direction, and
(b) quadrant means responsive to said steering means for turning both said main landing gear aft row trucks in the opposite direction.

24. A programming means as recited in claim 23 comprising,
(a) primary quadrant means connected to said steering means, and
(b) said primary quadrant means being responsive to said steering means for turning all trucks of said aft row in the opposite direction to said nose wheel turning.

25. A programming means as recited in claim 24 wherein,
(a) said primary quadrant means is responsive to said steering means for turning all aft row trucks in the opposite direction and proportionally to said nose wheel landing gear.

26. A programming means as recited in claim 25 comprising,
(a) secondary quadrant means connected to said primary quadrant means, and
(b) said secondary quadrant means being responsive to said primary quadrant means for turning all aft row trucks in the opposite direction and proportionally to said nose wheel landing gear.

27. A programming means as recited in claim 26 wherein,
(a) said secondary quadrant means includes cam track means and cam follower means, and
(b) said cam follower means is operable with said cam track means for turning all aft row trucks in a direction opposite and proportionally to said nose wheel landing gear.

28. A programming means as recited in claim 27 wherein,
(a) said cam follower means is responsive to said cam track means for turning all aft row trucks in a direction opposite to said nose wheel landing gear and differentially of each other for causing each of said aft row trucks to turn about said common center of turning radius.

29. A steering system as recited in claim 23 wherein,
(a) said auxiliary nose wheel landing gear and each of said fore and aft main landing gear trucks has a transverse axis, and said nose wheel transverse axis intersects said transverse axis of said fore main landing gear truck at a common center of turning radius when making a taxiing turn in one direction, and
(b) said quadrant means is responsive to said steerable means for turning all aft main landing gear trucks in an opposite direction until said transverse axis of each aft truck intersects said point.

30. A steering system as recited in claim 29 wherein,
(a) said quadrant means is responsive to said steering means for turning all aft row trucks oppositely in the other direction and differentially of each other until the transverse axis of each aft row truck intersects said center of turning radius.

31. A steering system as recited in claim 23 wherein,
(a) said quadrant means is responsive to said steering means for turning all of said main landing gear aft row trucks in a direction opposite to said nose wheel turning and proportionally to said nose wheel turning.

32. A steering system as recited in claim 23 in which said nose wheel turns about a turning circle and wherein,
(a) said quadrant means is responsive to said steering means for turning all of said main landing gear aft row trucks to a position tangent to a turning circle concentric with said nose wheel turning circle.

(References on following page)

References Cited

UNITED STATES PATENTS

| | | | |
|---|---|---|---|
| 2,550,137 | 4/1951 | Corns | 244—50 |
| 2,567,074 | 9/1951 | Kupiec | 244—50 |
| 2,650,782 | 9/1953 | Fehring | 244—50 |
| 2,682,311 | 6/1954 | Bishop | 244—50 XR |
| 2,804,158 | 8/1957 | Yunker | 180—79.2 |
| 3,323,610 | 6/1967 | Kress et al. | 180—79.2 |
| 3,387,684 | 6/1968 | Belke et al. | 180—79.2 |

FOREIGN PATENTS 535,098   3/1941   Great Britain.

OTHER REFERENCES

Engineering News-Record, Apr. 28, 1966, p. 24.

TRYGVE M. BLIX, Primary Examiner

P. E. SAUBERER, Assistant Examiner

U.S. Cl. X.R.

244—103